US006840237B2

(12) United States Patent
Strom et al.

(10) Patent No.: US 6,840,237 B2
(45) Date of Patent: Jan. 11, 2005

(54) METHOD FOR AUTO-IGNITION OPERATION AND COMPUTER READABLE STORAGE DEVICE

(75) Inventors: Hans Strom, Kode (SE); Lucien Koopmans, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/746,459

(22) Filed: Dec. 23, 2003

(65) Prior Publication Data

US 2004/0134462 A1 Jul. 15, 2004

(30) Foreign Application Priority Data

Dec. 30, 2002 (EP) ............................................ 02029060
Dec. 30, 2002 (EP) ............................................ 02029091

(51) Int. Cl.[7] ............................................ F02D 41/00
(52) U.S. Cl. ........................ 123/684; 123/681; 123/679
(58) Field of Search ................................ 123/681, 683, 123/684, 687, 679, 689

(56) References Cited

U.S. PATENT DOCUMENTS

| 4,193,380 | A | * | 3/1980 | Marchak et al. ............. 123/491 |
| 4,212,065 | A | * | 7/1980 | Marchak et al. ............. 701/104 |
| 4,213,180 | A | * | 7/1980 | Marchak et al. ............. 701/114 |
| 4,307,450 | A | * | 12/1981 | Carp et al. .................... 701/103 |
| 4,556,955 | A | * | 12/1985 | Wright et al. .................... 700/4 |
| 4,866,620 | A | * | 9/1989 | Abe et al. ..................... 701/103 |
| 5,220,904 | A | | 6/1993 | Miyashita et al. |
| 5,553,575 | A | * | 9/1996 | Beck et al. .............. 123/198 F |
| 5,967,114 | A | | 10/1999 | Yasuoka |
| 6,050,232 | A | | 4/2000 | Grob et al. |
| 6,125,691 | A | | 10/2000 | Hohner et al. |

FOREIGN PATENT DOCUMENTS

| EP | 1 088 979 | 1/2000 |
| EP | 1 031 722 | 2/2000 |
| EP | 1 085 192 | 9/2000 |
| EP | 1 134 378 | 3/2001 |
| WO | 99 42718 | 2/1999 |

OTHER PUBLICATIONS

Armstrutz et al, "Ego Sensor Based Robust Output Control of EGR in Diesel Engines", IEEE Transactions on Control Systems Technology, IEEE Inc. New York, US. vol. 3, No. 1, Mar. 1, 1995, pp. 39–48, XP000508609, ISSN:1063–6536.

* cited by examiner

Primary Examiner—John T. Kwon
(74) Attorney, Agent, or Firm—Allan J. Lippa

(57) ABSTRACT

The invention relates to an internal combustion engine comprising a fuel injector (2) for each cylinder; a fuel injection control unit (4) for controlling fuel injection quantity and a piston (5) in each cylinder whose compression action causes a mixture of air and fuel to be ignited. The engine is further provided with inlet and outlet valves (6, 7) and various sensors (12–16) for measuring various engine operating parameters. During compression ignition mode, the control unit (4) is arranged to select a $\lambda$-value from a map stored in the control unit, which value is a function of engine load and engine speed, and to compare the actual $\lambda$-value with the selected $\lambda$-value; whereby the control unit is arranged to adjust the intake manifold pressure as a function of the difference between the said $\lambda$-values in order to obtain the selected $\lambda$-value. The invention further relates to a method for operating the engine and a computer readable storage device (4).

24 Claims, 6 Drawing Sheets

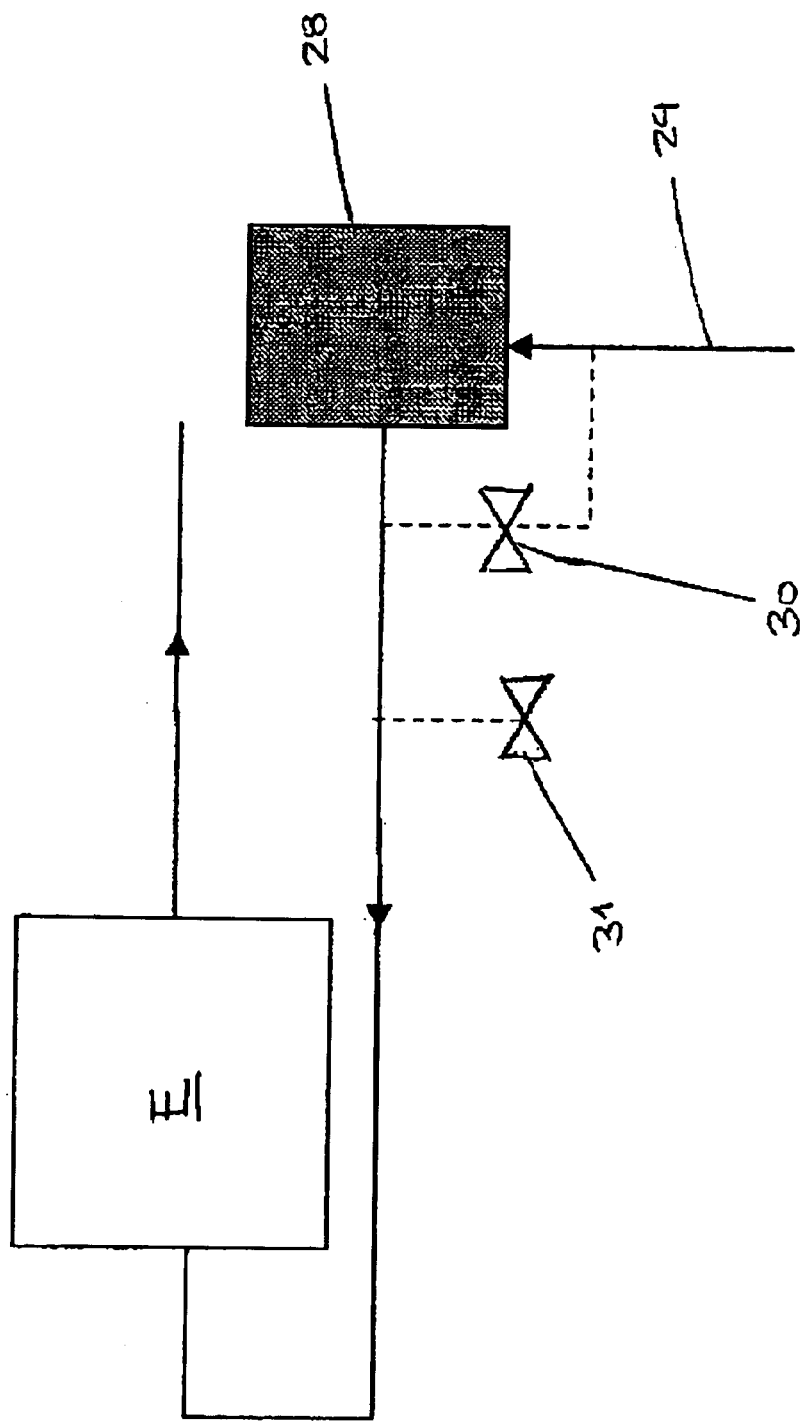

METHOD FOR AUTO-IGNITION OPERATION AND COMPUTER READABLE STORAGE DEVICE

The present application claims priority to European Patent Application No. 02029091.2, filed Dec. 30, 2002, titled INTERNAL COMBUSTION ENGINE, METHOD FOR AUTO-IGNITION OPERATION AND COMPUTER READABLE STORAGE DEVICE, naming Hans Ström and Lucien Koopmans as inventors, and claims priority to European Patent Application No. 02029060.7, filed Dec. 30, 2002, titled INTERNAL COMBUSTION ENGINE, METHOD FOR AUTO-IGNITION OPERATION AND COMPUTER READABLE STORAGE DEVICE, naming Hans Ström and Lucien Koopmans as inventors, the entire contents of which are incorporated herein by reference.

BACKGROUND AND TECHNICAL FIELD

The invention relates to an internal combustion engine that can be operated in a homogeneous charge compression ignition combustion mode, as well as a method for controlling such an engine.

DETAILED DESCRIPTION

To improve thermal efficiency of gasoline internal combustion engines, lean burn is known to give enhanced thermal efficiency by reducing pumping losses and increasing ratio of specific heats. Generally speaking, lean burn is known to give low fuel consumption and low $NO_x$ emissions. There is however a limit at which an engine can be operated with a lean air/fuel mixture because of misfire and combustion instability as a result of a slow burn. Known methods to extend the lean limit include improving ignitability of the mixture by enhancing the fuel preparation, for example using atomised fuel or vaporised fuel, and increasing the flame speed by introducing charge motion and turbulence in the air/fuel mixture. Finally, combustion by auto-ignition, or homogeneous charge compression ignition, has been proposed for operating an engine with very lean or diluted air/fuel mixtures.

When certain conditions are met within a homogeneous charge of lean air/fuel mixture during low load operation, homogeneous charge compression ignition can occur wherein bulk combustion takes place initiated simultaneously from many ignition sites within the charge, resulting in very stable power output, very clean combustion and high fuel conversion efficiency. $NO_x$ emission produced in controlled homogeneous charge compression ignition combustion is extremely low in comparison with spark ignition combustion based on propagating flame front and heterogeneous charge compression ignition combustion based on an attached diffusion flame. In the latter two cases represented by spark ignition engine and diesel engine, respectively, the burnt gas temperature is highly heterogeneous within the charge with very high local temperature values creating high $NO_x$ emission. By contrast, in controlled homogeneous charge compression ignition combustion where the combustion is uniformly distributed throughout the charge from many ignition sites, the burnt gas temperature is substantially homogeneous with much lower local temperature values resulting in very low $NO_x$ emission.

Engines operating under controlled homogeneous charge compression ignition combustion have already been successfully demonstrated in two-stroke gasoline engines using a conventional compression ratio. It is believed that the high proportion of burnt gases remaining from the previous cycle, i.e., the residual content, within the two-stroke engine combustion chamber is responsible for providing the hot charge temperature and active fuel radicals necessary to promote homogeneous charge compression ignition in a very lean air/fuel mixture. In four-stroke engines, because the residual content is low, homogeneous charge compression ignition is more difficult to achieve, but can be induced by heating the intake air to a high temperature or by significantly increasing the compression ratio. This effect can also be achieved by retaining a part of the hot exhaust gas, or residuals, by controlling the timing of the intake and exhaust valves.

In all the above cases, the range of engine speeds and loads in which controlled homogeneous charge compression ignition combustion can be achieved is relatively narrow. The fuel used also has a significant effect on the operating range; for example, diesel and methanol fuels have wider auto-ignition ranges than fuel. A further problem is to achieve ignition at a particular time with maintained combustion stability, while avoiding engine knocking, misfiring and increased $NO_x$ levels.

When the engine is operating in HCCI mode, a low fuel consumption has to be sustained and or optimised. For low fuel consumption, the air/fuel ratio has to be greater than stoichiometric, i.e. substantially 1 part fuel and 14 parts air. There is a trend for lower fuel consumption in the direction of higher values of lambda if good combustion stability can be sustained. A three way catalyst only converts unburned hydrocarbons and carbon monoxide when the engine is operating lean ($\lambda>1$), hence $NO_x$ emissions will be emitted to the atmosphere without after-treatment.

High lambda values for optimised fuel consumption and $NO_x$ emissions can not be achieved with atmospheric pressure in the inlet manifold in combination with the inlet and exhaust valve settings used for HCCI combustion.

Hence an object of the invention is to provide a means for controlling the combustion process during auto-ignition, in order to maintain low $NO_x$ levels. Said means allows for monitoring of current combustions and for correction of subsequent combustions dependent on the outcome of the monitoring process.

The above problems can be solved, in some cases, by an arrangement, a method and a computer readable storage device for controlling homogeneous charge compression ignition combustion, as described in more detail below.

One embodiment relates to an internal combustion engine preferably, but not necessarily, provided with variable valve timing (VVT), cam profile switching (CPS), direct fuel injection (DI), and means for boosting the manifold absolute pressure (turbo, compressor etc.).

The following text will be mainly concentrated on embodiments including the above features. However, the general principle of the invention as claimed is also applicable to, for instance, stationary aspirating engines with fixed valve timing and a standard camshaft. Such engines are often operated at fixed speeds and loads and are not subject to the transients normally occurring in, for instance, engines for vehicles.

Also, although the following examples relate to fuels, an engine operating according to principles of the invention can be adapted to use most commonly available fuels, such as kerosene, natural gas, and others.

The engine is possible to be operated on homogeneous charge compression ignition (HCCI) combustion mode. This is a combustion mode, different than conventional spark ignited (SI) combustion mode, in order to reduce fuel consumption in combination with ultra low $NO_x$ emissions.

In this mode, a mixture containing fuel, air and combustion residuals is compressed with a compression ratio between 10.5 and 12 to auto ignition. The HCCI combustion has no moving flame front, in contradiction to a SI combustion that has a moving flame front. The lack of a flame front reduces temperature and increases the heat release rate hence increases the thermal efficiency of the combustion. The combustion residuals are captured when operating the engine with a negative valve overlap. Residuals increase the temperature of the mixture so that the auto ignition temperature is reached before piston top dead center (TDC) and dilute the mixture so that the heat release rate decreases to an acceptable level. By controlling the heat release, cycle-to-cycle variations (COV), noise and knocking combustion can be reduced. The negative valve overlap is achieved when the exhaust valve is closed before piston TDC and the inlet valve is opened after piston TDC in the gas exchange phase of the engine cycle.

The acquired valve timing for the negative overlap can be achieved by using VVT and CPS, hence switching from conventional SI valve timing to HCCI valve timing with a shorter the valve opening duration and/or valve lift In HCCI combustion mode one target is to keep $NO_x$ emissions below the legislative limit by using a control loop that controls the HCCI combustion. NOx emissions, fuel consumption and combustion stability are affected by the air fuel ratio of the mixture in the combustion chamber. A low air fuel ratio gives high fuel consumption and high $NO_x$ emissions, while a high air fuel ratio gives low fuel consumption and low HC emissions.

According to one embodiment of the invention, an internal combustion engine is provided with at least one cylinder and arranged to be switched between spark ignition mode and compression ignition mode. The engine comprises a fuel injector, through which fuel is injected into a combustion chamber, for each cylinder and a fuel injection control unit that controls fuel injection quantity per combustion cycle injected through each fuel injector. Fuel injection is preferably, but not necessarily, achieved by means of direct injection (DI) into each combustion chamber. For the current invention, port injection is also possible.

A spark may be sustained in HCCI mode in order to keep the spark plug from fouling and, although the gas mixture is arranged to self ignite, contribute to an increased combustion stability and avoidance of misfire.

A reciprocating piston is arranged in each engine cylinder whose compression action causes a mixture of air and fuel within the combustion chamber to be ignited. Gas exchange is controlled by at least one inlet valve preferably, but not necessarily, provided with variable valve timing per cylinder for admitting a combustible gas, such as air, and at least one exhaust valve preferably, but not necessarily, provided with variable valve timing per cylinder for exhausting combusted gases.

The combustion process is monitored by sensors for measuring air intake manifold pressure and the air/fuel ratio, or $\lambda$-value, for the combusted exhaust gas, as well as standard sensors for engine load and engine speed.

Other sensors may include temperature sensors for engine coolant and oil as well as $NO_x$-sensors and ion current sensors. If required, the engine may also be provided with engine knocking and combustion stability sensors. The knock sensor can be of the piezo-electric type, which may also be used for continuous monitoring of cylinder pressure. The combustion stability sensor may be an acceleration type sensor, such as a flywheel sensor, or an ion current sensor.

Alternatively, both said sensors can be replaced by a single in-cylinder piezoelectric pressure sensor. By processing the output from such a sensor, it is possible to obtain a signal representing engine knock and a signal representing engine stability.

According to a further embodiment the engine is switched into a compression ignition mode. The control unit is arranged to select a $\lambda$-value from a map of $\lambda$-values stored in the control unit, which value is a function of engine load and engine speed. The actual $\lambda$-value is compared to the selected $\lambda$-value; whereby the control unit is arranged to adjust the intake manifold pressure as a function of the difference between the said $\lambda$-values in order to obtain the selected $\lambda$-value.

High $\lambda$-values combined with low fuel consumption and low $NO_x$ emissions can not be achieved with atmospheric pressure in the intake manifold during HCCI operation at high loads and/or speeds. In one embodiment the engine is provided with an intake air charging unit, arranged to adjust the intake manifold pressure.

The intake air charging unit may be a turbocharger provided with a wastegate for controlling the intake manifold pressure. Alternatively the intake air charging unit is a supercharger provided with a throttle for controlling the intake manifold pressure.

According to a further embodiment, the intake air charging unit is arranged to increase the intake manifold pressure if the actual $\lambda$-value is less than the selected $\lambda$-value. Similarly, the intake air charging unit is arranged to decrease the intake manifold pressure if the measured actual $\lambda$-value is greater than or equal to the selected $\lambda$-value.

According to a further embodiment, the intake manifold is provided with a sensor for measuring intake air temperature. As the $\lambda$-value may vary with intake air temperature, the control unit is arranged to adjust the selected $\lambda$-value if necessary. The adjustment is based on the measured intake air temperature compared to a reference temperature for the stored map.

According to a further embodiment, the invention relates to a computer readable storage device having stored therein data representing instructions executable by a computer to implement a compression ignition for An internal combustion engine, the engine having a piston disposed in a cylinder to define a combustion chamber, intake valves for admitting fresh air into the cylinder, a fuel injector for injecting fuel into the combustion chamber, exhaust valves for discharging exhaust gas resulting from combustion within the cylinder, wherein opening and closing timings of the intake means and opening and closing timings of the exhaust means are adjustable, and sensors for measuring engine load, engine speed and an actual $\lambda$-value for the exhaust gas.

The computer readable storage device comprises:
  instructions for adjusting opening and closing timings of the intake means and opening and closing timings of the exhaust means such that the piston reciprocates within the cylinder to perform an exhaust phase, an exhaust gas retaining phase, an intake phase, a compression phase, and an expansion phase;
  instructions for providing a first start time of a first fuel injection by the fuel injector during said exhaust gas retaining phase and a second start time of a second fuel injection by the fuel injector during said exhaust gas retaining phase;
  instructions for selecting a $\lambda$-value from a map stored in the control unit, which value is a function of engine load and engine speed;

instructions for determining a difference between the actual λ-value with the selected λ-value; and instructions for adjusting the intake manifold pressure as a function of the difference between the said λ-values in order to obtain the selected λ-value The computer readable storage device further comprises instructions for determining intake manifold pressure control signals indicative of the adjustment required by an intake air charging unit, as determined by the control unit on the basis of comparison between the measured actual λ-value with the selected λ-value.

The storage device further comprises instructions for determining intake manifold temperature by means of a temperature sensor and for adjusting the λ-values in said stored map with respect to the measured temperature.

According to one embodiment, the engine is arranged to switch from SI-mode to HCCI-mode when certain operating parameters are fulfilled. During compression ignition mode, the exhaust valve is arranged to close before top dead center during an exhaust stroke of the piston and the intake valve is opened after top dead center during a suction stroke of the piston. This creates a period of negative valve overlap, during which exhaust and intake valves are closed. The fuel injection control unit is arranged to control the fuel injection quantity so as to perform a first fuel injection before top dead center of the piston stroke and to perform a second fuel injection after top dead center of the piston stroke during the interval when both of the exhaust and intake valves are closed. However, other examples of this so called split injection timing are also possible.

BRIEF DESCRIPTION OF DRAWINGS

In the following text, further embodiments will be described in detail with reference to the attached drawings. These drawings are used for illustration only and do not in any way limit the scope of the invention. In the drawings:

FIGS. 5A–B shows diagrams of an engine provided with different types of intake air charging devices.

FIG. 1 shows a schematic illustration of an internal combustion engine according to the invention. The engine is provided with at least one cylinder 1 and comprises a fuel injector 2, through which fuel is injected into a combustion chamber 3, for each cylinder. A fuel injection control unit 4 controls fuel injection quantity per combustion cycle injected through each fuel injector. A piston 5 in the engine cylinder has a compression action that causes a mixture of air and fuel within the combustion chamber to be ignited during HCCI-mode. The cylinder is provided with at least one inlet valve 6 for admitting gas which includes fresh air into said cylinder and at least one exhaust valve 7 for exhausting combusted gases from said cylinder. Air is supplied through an intake conduit 9 connected to an intake manifold, while exhaust gas is exhausted through an exhaust conduit 10. During SI-mode, the ignition of the fuel/air mixture is ignited by a spark plug 8.

Figure 1:
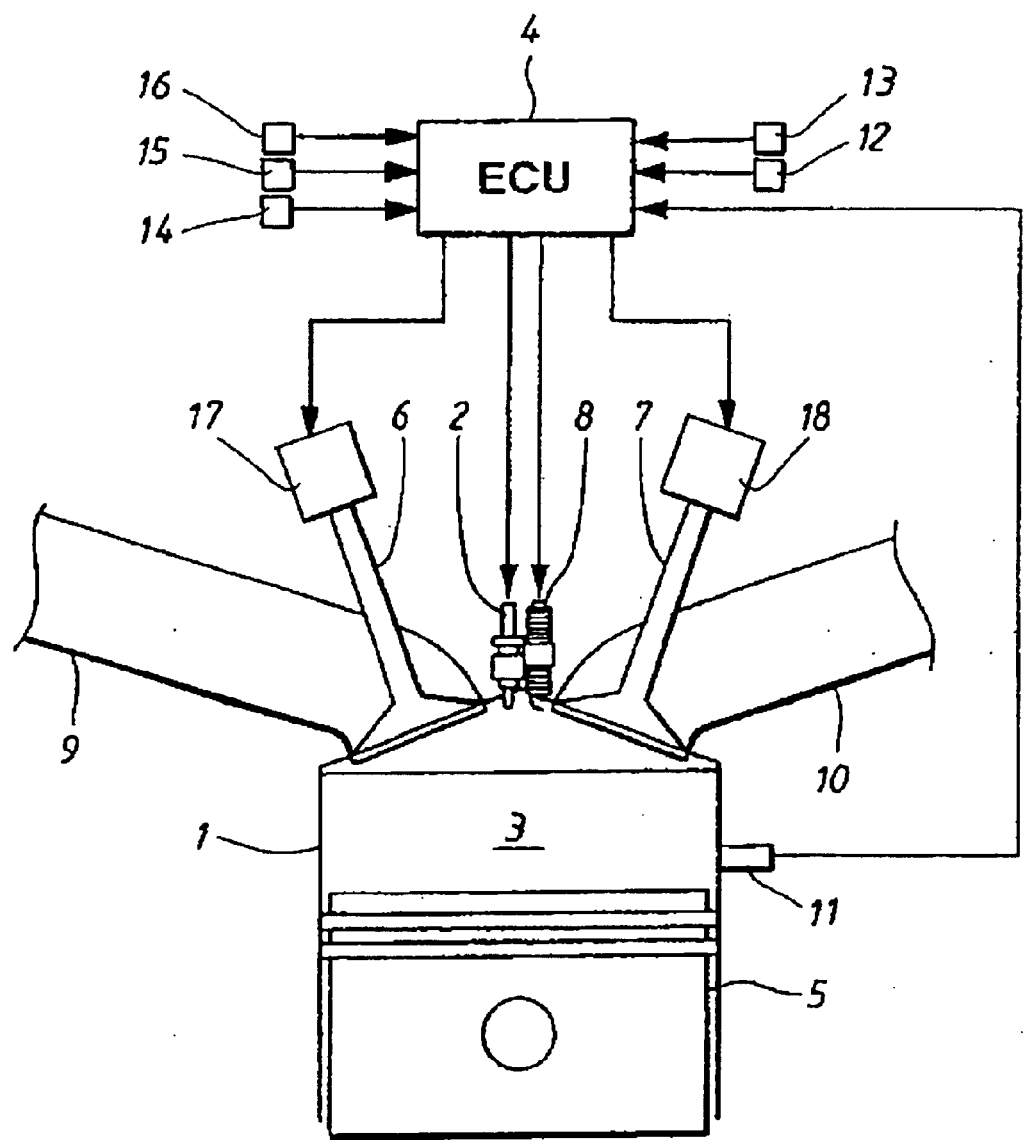
FIG. 1 shows a schematic internal combustion engine.

The control unit receives signals from at least one sensor for measuring engine operation parameters, which sensors may include a combustion chamber pressure sensor 11, an intake manifold pressure sensor 12 and a λ-probe 13 in the exhaust conduit, as well as a temperature sensor for intake air 14, an engine load sensor 15 and an engine speed sensor 16. The control unit controls the intake and exhaust valves 6, 7 by means of valve actuators 17, 18. The actuators may be either electrically or mechanically operated.

Figure 2:
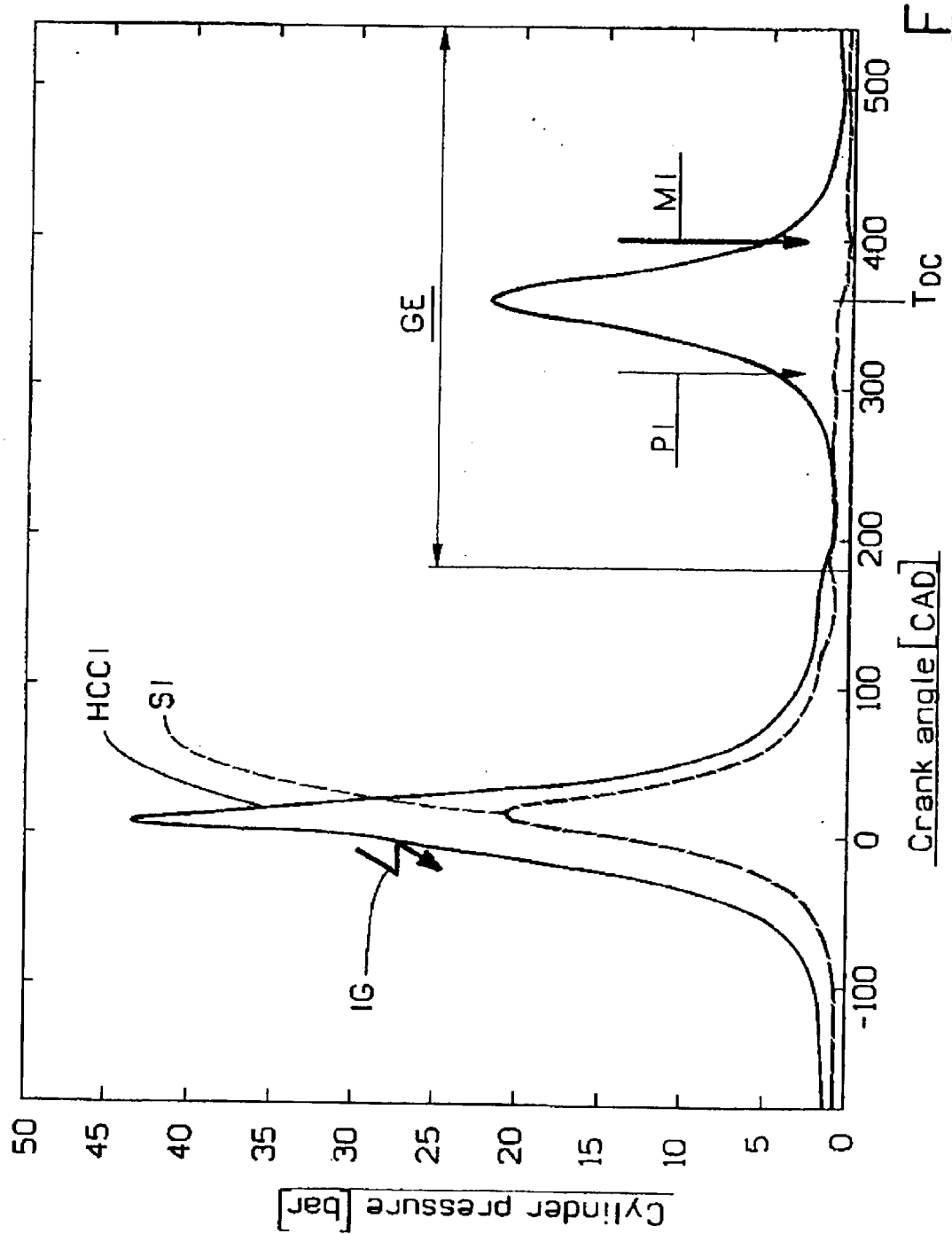
FIG. 2 shows a diagram illustrating the variation of cylinder pressure over crank angle for HCCI- and SI-mode.

According to an alternative embodiment, the λ-probe 13 can be replaced or supplemented by a $NO_x$-sensor or an ion current sensor, which generates a signal indicative of the λ-value. The function of the latter sensors will be described in connection with FIG. 4 below. Similarly, the sensors for engine load and speed 15, 16 may be replaced or supplemented by temperature sensors for engine coolant and engine oil FIG. 2 shows a diagram illustrating the variation of cylinder pressure over crank angle for HCCI- and SI-mode. As can be seen from the curves in the diagram, the engine can be operated in homogeneous charge compression ignition (HCCI) combustion mode and in conventional spark ignited (SI) combustion mode. The HCCI combustion has no moving flame front, as opposed to a SI combustion that has a moving flame front. The lack of a flame front reduces temperature and increases the heat release rate hence increases the thermal efficiency of the combustion. This will result in a considerably higher peak pressure after ignition (IG); typically in excess of 40 bar, as opposed to about 20 bar in SI mode. The main difference between the HCCI- and SI modes is that a part of the combustion residuals are captured by operating the engine with a negative valve overlap. The negative valve overlap is achieved by closing the exhaust valve, or EV, before piston TDC (EVC) and opening the inlet valve, or IV, after piston TDC (IVO) in the gas exchange (GE) phase of the combustion, as illustrated in FIG. 2. During the air intake phase, residuals increase the temperature of the mixture so that the auto ignition temperature is reached before piston top dead center (TDC) and dilutes the mixture so that the heat release rate decreases to an acceptable level. By controlling the heat release, noise and knocking combustion can be reduced.

A split fuel injection is used having a pilot direct fuel injection (PI) before TDC during the negative valve overlap and a main direct fuel injection (MI) after TDC of the negative valve overlap. The relative quantities of fuel injected during the pilot and the main injections can be varied and are calculated and controlled by a fuel injection control unit (not shown). The fuel of the pilot injection (PI) will react with the retained residuals, forming intermediates or combustion products. This reaction can be exothermic hence heating the residuals, resulting in earlier timing of the auto ignition temperature. The total quantity of injected fuel for the pilot and the main injection is substantially constant with respect to the current engine speed requirements. The quantity of the first injection is selected to be in the range of 10–45% of the total amount of injected fuel.

The above example describes a split fuel injection occurring before and after top dead center of the piston stroke during the interval when both of the exhaust and intake valves are closed. However, the invention is not limited to this particular embodiment of split injection timing.

Due to the demand for dilution, which controls the rate of heat release, only the part load regime of the engine is used for HCCI combustion mode. The auto ignition timing for HCCI operation can be controlled by the pilot fuel injection and/or the captured amount of residuals and/or the absolute manifold pressure. The latter is controlled by increasing or decreasing the pressure of the intake air by means of a compressor or turbocharger.

According to one embodiment, the amount of trapped residuals during negative overlap should be in the range 20–60%, irrespective of how this is achieved.

When operating the engine, it is desirable to avoid engine knocking, low combustion stability and a high noise level. Knocking, which is also a source of noise, is detected by measuring the peak pressure and/or pressure variations caused by a too rapid heat release during the expansion phase. Knocking occurs when the peak pressure exceeds an expected maximum pressure, or when a series of rapid pressure variations occur during the expansion phase. Low combustion stability is indicated by high cycle to cycle variations of the pressure during combustion. Typically, an engine operated in HCCI mode may oscillate between a late phased combustion (low cylinder pressure) and a subsequent early phased combustion (high cylinder pressure). However, the above conditions are of less importance for the current invention.

Figure 3:
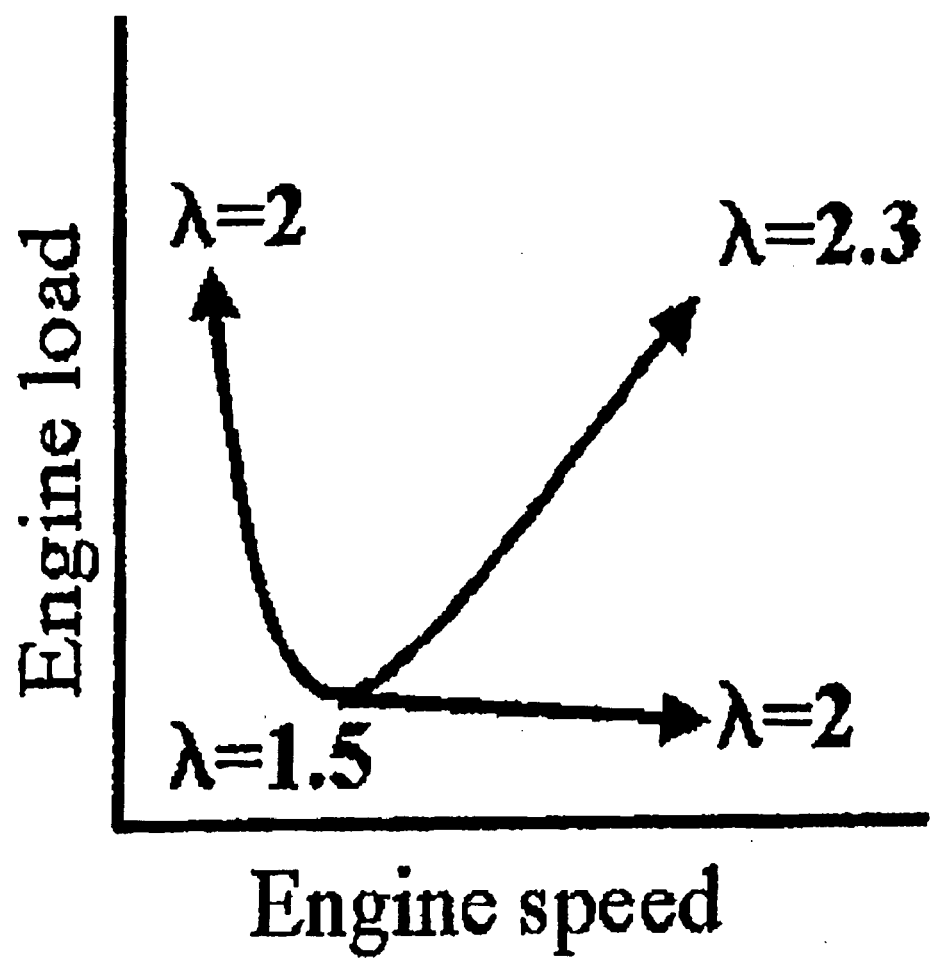
FIG. 3 shows a diagram illustrating the variation of lambda in relation to engine load and engine speed in HCCI-mode.

FIG. 3 illustrates a schematic $\lambda$ map to be stored in a control unit. As seen from the figure, the air/fuel ratio $\lambda$ is approximately=1.5 at idling speed under a low load. If either the load or the engine speed is increased, while the other parameter is kept substantially constant, then the air/fuel ratio is increased to approximately $\lambda$=2. When both engine speed and engine load are increased according to the linear function shown, then the air/fuel ratio is increased to approximately $\lambda$=2.3.

Figure 4:
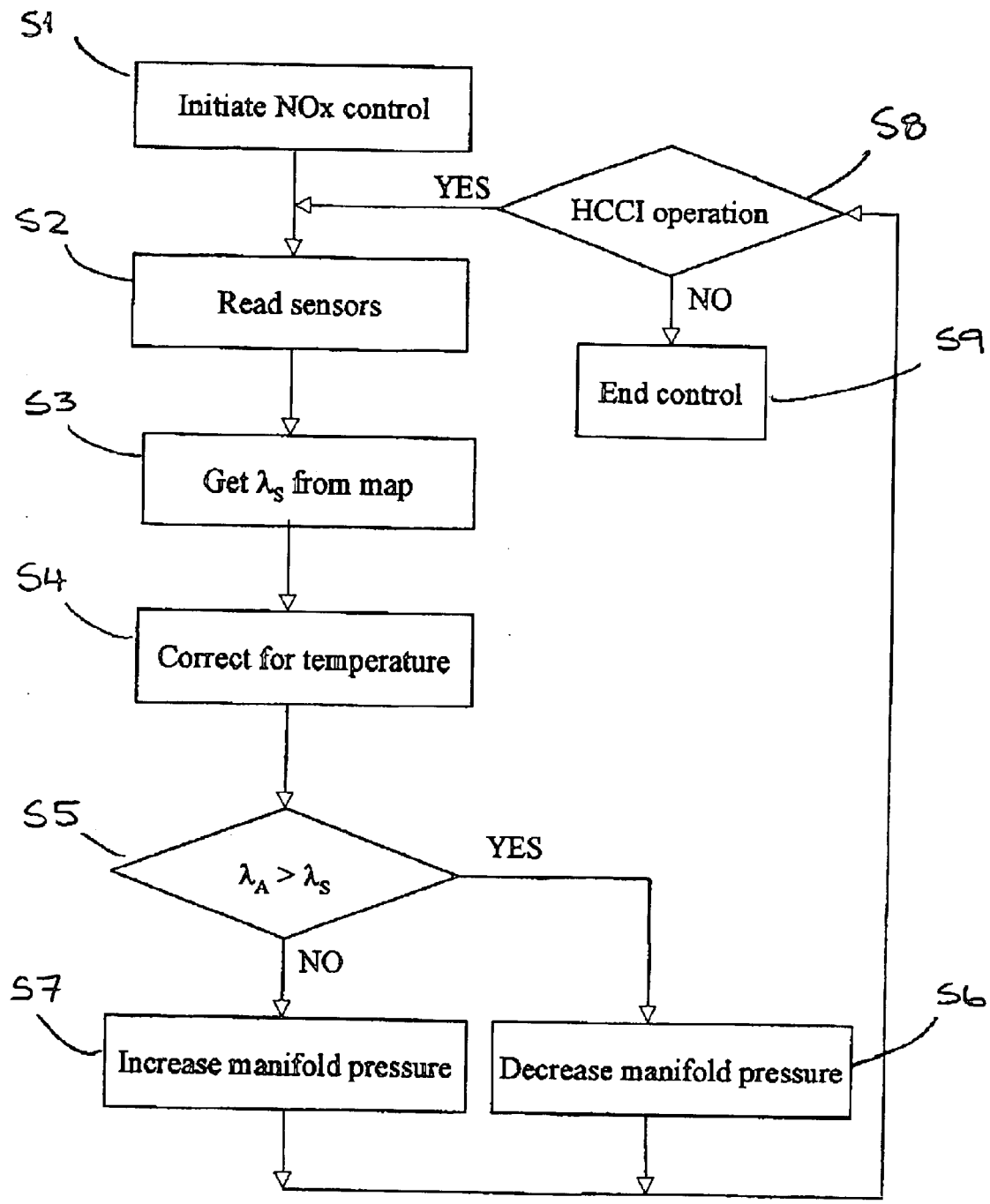
FIG. 4 shows a diagram for a lambda control loop for combustion control in HCCI-mode.

FIG. 4 shows a schematic diagram for a control strategy for managing the $NO_x$ emissions by adjusting the absolute pressure in the air intake manifold. The adjustments are made based on a comparison between the measured, actual lambda value and a lambda value selected on the basis of a number of sensor readings. It is not possible to adjust the intake manifold pressure from cycle to cycle. The control strategy involves an evaluation of the output signals from multiple sensors, primarily an engine speed sensor, an engine load sensor and pressure and temperature sensors in the intake manifold.

When the engine is switched to HCCI-mode the NOx control loop S1 is initiated by a control unit. In a first step S2, the control unit reads the signals transmitted from a $\lambda$-sensor, an engine speed sensor, an engine load sensor, an intake manifold pressure sensor and an intake air temperature sensor. Further sensors may include temperature sensors for engine oil and coolant.

When receiving the signals for engine speed and engine load, the control unit will use these values to look up and select an associated value for lambda $\lambda_s$ in a map S3 stored in the control unit. The control unit will then check the signal from the intake manifold temperature $T_M$ sensor and correct the selected $\lambda$-value S4, if the measured temperature $T_M$ deviates from a predetermined reference temperature $T_{REF}$ for said stored map. In general, if the intake manifold temperature $T_M$ increases the $\lambda$-value will need to be corrected upwards. Such a correction may also be required for increasing temperatures for engine oil and coolant, which contributes to a general increase in temperature of the engine.

The control unit will then compare the selected $\lambda_s$ with a measured $\lambda$-value $\lambda_A$ for the air fuel ratio in the exhaust gas S5. If $\lambda_A > \lambda_S$ then the control unit will transmit a signal to the intake air charging unit to decrease the absolute intake pressure S6. Similarly, if $\lambda_A < \lambda_S$ then the control unit will transmit a signal to said air charging unit to increase the absolute intake pressure S7.

Before repeating the control loop, the control unit checks that the HCCI-mode is still in operation S8. If this is not the case, then the $NO_x$ control ends S9.

In the above example the $\lambda$-value is measured using a $\lambda$-sensor, such as an oxygen sensor. However, it is also possible to use sensors that generate a signal indicative of the $\lambda$-value, such as a $NO_x$-sensor or an ion current sensor. Hence, for the step S5 above, either of a $NO_x$ signal or ion current signal may be compared to a respective reference signal. If either signal is lower than its reference signal, the control unit will transmit a signal to the intake air charging unit to decrease the absolute intake pressure S6, and vice versa. According to a further embodiment, the value of $\lambda$ may be calculated by the ECU, using the mass air flow (MAF) and the amount of injected fuel.

High $\lambda$-values combined with low fuel consumption and low $NO_x$ emissions can not be achieved with atmospheric pressure in the intake manifold during HCCI operation at high loads and/or speeds. In one embodiment the engine is provided with an intake air charging unit, arranged to adjust the intake manifold pressure.

Figure 5A:
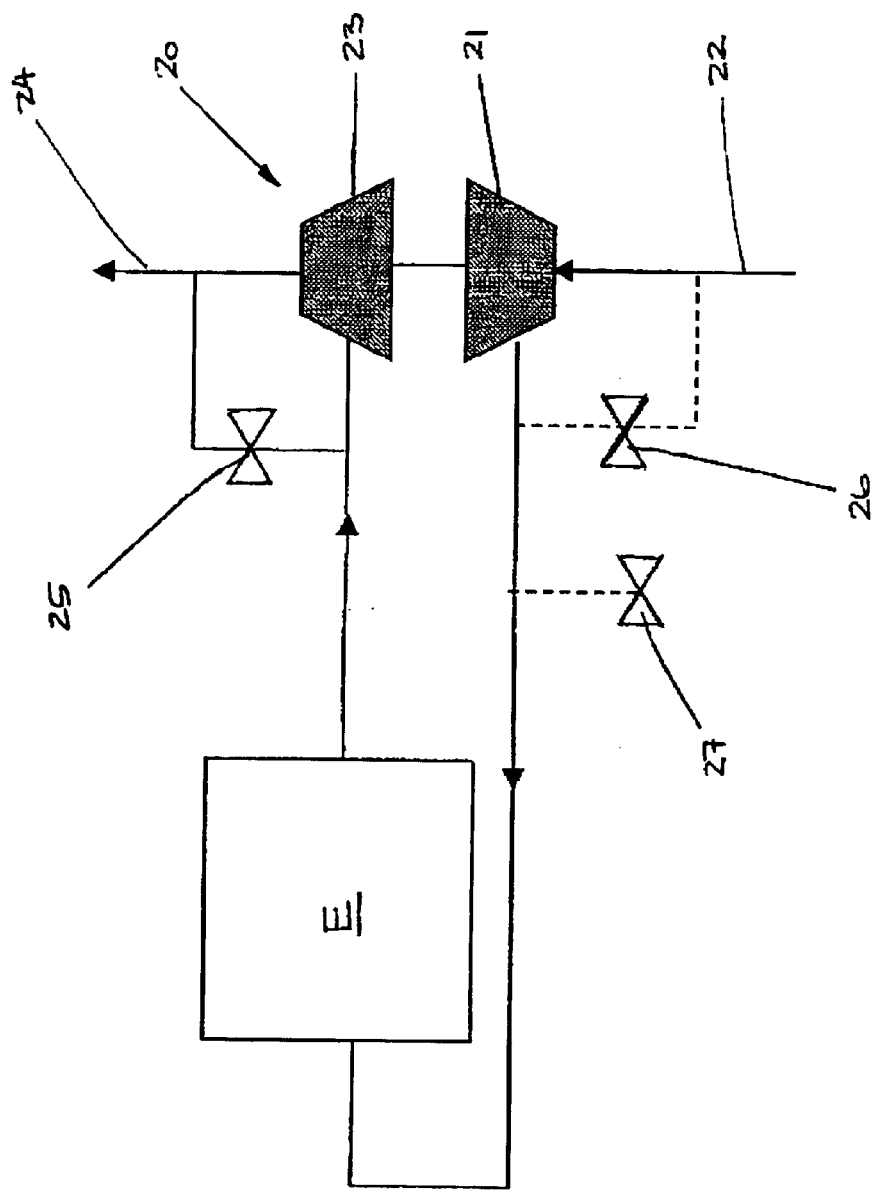

FIGS. 5A and 5B show different air charging arrangements for an engine E as described in connection with FIG. 1. According to FIG. 5A, the intake air charging unit may be a turbocharger 20 having a compressor 21 for intake air 22 and a turbine 23 driven by exhaust gases 24 from the engine E, which turbine is provided with a wastegate for controlling the intake manifold pressure. According to one embodiment, this wastegate 25 may be connected to bypass the turbine 23. However, according to an alternative embodiment a wastegate 26 may be connected to bypass the compressor 21, as indicated by dotted lines in the figure. A controllable valve 27 may also be connected to the intake conduit between the compressor 21 and the engine E, to exhaust compressed air to the atmosphere.

FIG. 5B shows an alternatively intake air charging unit in the form of a supercharger 28 for intake air 29. As in the case of the turbocharger in FIG. 5A, the supercharger is provided with a throttle or wastegate for controlling the intake manifold pressure. A wastegate 30 may be connected to bypass the supercharger 28, as indicated by dotted lines in the figure. A controllable valve 31 may also be connected to the intake conduit between the supercharger 28 and the engine E, to exhaust compressed air to the atmosphere.

According to one embodiment, the intake air charging unit is arranged to increase the intake manifold pressure if the actual $\lambda$-value is less than the selected $\lambda$-value. Similarly, the intake air charging unit is arranged to decrease the intake manifold pressure if the measured $\lambda$-value is greater than or equal to the selected $\lambda$-value.

The invention is not limited to the embodiments described above and may be varied freely within the scope of the appended claims.

What is claimed is:

1. An internal combustion engine provided with at least one cylinder and comprising:
   a fuel injector, through which fuel is injected into a combustion chamber, for each cylinder;
   a piston in the engine cylinder whose compression action causes a mixture of air and fuel within the combustion chamber to be ignited;
   at least one inlet valve for admitting gas which includes fresh air into said cylinder;
   at least one exhaust valve for exhausting combusted gases;
   a pressure sensor for measuring intake manifold pressure and generating a pressure signal;
   a sensor for generating a signal representing an actual $\lambda$-value;

sensors for measuring at least one further engine operation parameter, and a control unit that controls fuel injection quantity per combustion cycle injected through each fuel injector, and during compression ignition mode, the control unit is arranged to select a λ-value from a map stored in the control unit, which value is a function of engine load and engine speed, and to compare the actual λ-value with the selected λ-value; whereby the control unit is arranged to adjust the intake manifold pressure as a function of the difference between the said λ-values in order to obtain the selected λ-value.

2. The internal combustion engine according to claim 1, wherein the engine is provided with an intake air charging unit, arranged to adjust the intake manifold pressure.

3. The internal combustion engine according to claim 2, wherein said λ-sensor is arranged to measure an air/fuel ratio and generate a signal representing the actual λ-value.

4. The internal combustion engine according to claim 3, wherein the intake air charging unit is a turbocharger.

5. The internal combustion engine according to claim 4, wherein the turbocharger is provided with a wastegate for controlling the intake manifold pressure.

6. The internal combustion engine according to claim 3, wherein the intake air charging unit is a supercharger.

7. The internal combustion engine according to claim 6, wherein the supercharger is provided with a throttle for controlling the intake manifold pressure.

8. The internal combustion engine according to claim 3, wherein the intake air charging unit is arranged to increase the intake manifold pressure if the actual λ-value is less than the selected λ-value.

9. The internal combustion engine according to claim 3, wherein the intake air charging unit is arranged to decrease the intake manifold pressure if the measured λ-value is greater than or equal to the selected λ-value.

10. The internal combustion engine according to claim 2, wherein a $NO_x$-sensor is arranged to generate a signal representing the actual λ-value.

11. The internal combustion engine according to claim 2, wherein an ion current sensor is arranged to generate a signal representing the actual λ-value.

12. The internal combustion engine according to claim 1, wherein the engine is provided with a sensor for measuring current engine load and a sensor for measuring engine speed.

13. The internal combustion engine according to claim 11, wherein the control unit is arranged to adjust the stored map of λ-values based a measured intake air temperature.

14. The internal combustion engine according to claim 1, wherein the engine is provided with a sensor for measuring engine oil temperature and a sensor for measuring coolant temperature.

15. A method for operating an internal combustion engine in a compression ignition mode of operation, the engine provided with at least one cylinder, the engine having a fuel injector, through which fuel is injected into a combustion chamber, for each cylinder; a control unit that controls fuel injection quantity per combustion cycle injected through each fuel injector; a piston in the engine cylinder whose compression action causes a mixture of air and fuel within the combustion chamber to be ignited during compression ignition mode; at least one inlet valve for admitting gas which includes fresh air into said cylinder; at least one exhaust valve for exhausting combusted gases; a sensor for measuring intake manifold pressure and generating a pressure signal; a sensor for generating a signal representing an actual λ-value; and sensors for measuring current engine load and engine speed, the method comprising:

selecting a λ-value from a map stored in the control unit, which value is a function of engine load and engine speed;

comparing the actual λ-value with the selected λ-value; and adjusting the intake manifold pressure as a function of the difference between the said λ-values in order to obtain the selected λ-value.

16. The method according to claim 15 further comprising using a $NO_x$-sensor to generate a signal representing the actual λ-value.

17. The method according to claim 15 further comprising increasing the intake manifold pressure if the measured λ-value is less than the selected λ-value.

18. The method according to claim 17, further comprising decreasing the intake manifold pressure if the measured λ-value is greater than or equal to the selected λ-value.

19. The method according to claim 18 further comprising measuring intake air temperature and adjusting the λ-values in said stored map with respect to the measured temperature.

20. The method according to claim 15 further comprising adjusting the intake manifold pressure using an intake air charging unit.

21. The method according to claim 20 further comprising using an intake air charging unit in the form of a turbocharger.

22. The method according to claim 20 further comprising controlling the intake air charging unit using a throttle or a wastegate.

23. The method according to claim 20 further comprising using an intake air charging unit in the form of a supercharger.

24. The method according to claim 20 further comprising controlling the intake air charging unit using a throttle.

* * * * *